(12) United States Patent
Oyaide

(10) Patent No.: US 7,774,113 B2
(45) Date of Patent: Aug. 10, 2010

(54) CAMERAS TO DETERMINE VEHICLE HEADING

(75) Inventor: Andrew Oghenovo Oyaide, Birmingham (GB)

(73) Assignee: TRW Limited, West Midlands (GB)

( * ) Notice: Subject to any disclaimer, the term of this patent is extended or adjusted under 35 U.S.C. 154(b) by 66 days.

(21) Appl. No.: 10/960,886

(22) Filed: Oct. 7, 2004

(65) Prior Publication Data

US 2005/0113995 A1 May 26, 2005

Related U.S. Application Data

(63) Continuation of application No. PCT/GB03/01519, filed on Apr. 7, 2003.

(30) Foreign Application Priority Data

Apr. 10, 2002 (GB) ................................. 0208217.0

(51) Int. Cl.
*G06K 9/00* (2006.01)
(52) U.S. Cl. ........................... 701/36; 701/41; 701/300; 348/118; 382/104; 356/27
(58) Field of Classification Search .................. 701/36, 701/28, 41, 300; 348/118, 119; 382/104, 382/106, 107; 356/27, 150, 139.04
See application file for complete search history.

(56) References Cited

U.S. PATENT DOCUMENTS

| | | | | |
|---|---|---|---|---|
| 5,243,524 A | * | 9/1993 | Ishida et al. | 701/28 |
| 5,586,063 A | * | 12/1996 | Hardin et al. | 702/142 |
| 5,835,880 A | | 11/1998 | Gan et al. | 701/205 |
| 6,070,112 A | * | 5/2000 | Sato et al. | 701/41 |
| 6,119,061 A | * | 9/2000 | Schenkel et al. | 701/42 |
| 6,184,821 B1 | * | 2/2001 | Hrovat et al. | 342/357.08 |

(Continued)

FOREIGN PATENT DOCUMENTS

EP     0 952 427     10/1999

(Continued)

OTHER PUBLICATIONS

Chen et al., Aurora: A Vision-Based Roadway Departure Warning System, Intelligent Robots and Systems 95, IEEE, vol. 1, Aug. 5-9, 1995, pp. 243-248.*

(Continued)

*Primary Examiner*—Khoi Tran
*Assistant Examiner*—Brian J Broadhead
(74) *Attorney, Agent, or Firm*—MacMillan, Sobanski & Todd, LLC

(57) ABSTRACT

A method of calculating the heading angle of a vehicle using a camera associated with the vehicle, the method comprising capturing at least two images with the camera, calculating the lateral speed of the vehicle from the images, calculating the ground speed of the vehicle and calculating, from the ground speed and the lateral speed, a first heading angle of the vehicle. The method may also include calculating a second heading value from the images and from that a misalignment value indicative of the alignment of the camera from some datum. The misalignment value may be used to correct the first heading angle and the process repeated iteratively. The method may also include fitting features that follow features that follow the direction of travel of the vehicle. A camera system and data carrier embodying the method are also disclosed.

35 Claims, 4 Drawing Sheets

U.S. PATENT DOCUMENTS

| | | | |
|---|---|---|---|
| 6,285,393 B1 * | 9/2001 | Shimoura et al. | 348/119 |
| 6,704,621 B1 * | 3/2004 | Stein et al. | 701/1 |
| 6,778,928 B2 * | 8/2004 | Stiller | 702/104 |
| 6,807,287 B1 * | 10/2004 | Hermans | 382/104 |
| 2002/0095246 A1 * | 7/2002 | Kawazoe | 701/1 |
| 2003/0182041 A1 * | 9/2003 | Watson | 701/45 |
| 2005/0259244 A1 * | 11/2005 | Kurfiss et al. | 356/221 |

FOREIGN PATENT DOCUMENTS

| | | |
|---|---|---|
| JP | 4-273301 | 9/1992 |
| JP | 11-28948 | 2/1999 |
| JP | 11-189166 | 7/1999 |
| JP | 2002-117391 | 4/2002 |
| WO | 01/65274 | 9/2001 |

OTHER PUBLICATIONS

Data Carrier, undated, www.computerhope.com/jargon/d/datacarr.htm.*

Heading. Academic Press Dictionary of Science and Technology (1992), Retrieved May 15, 2006, from xreferplus.*

* cited by examiner

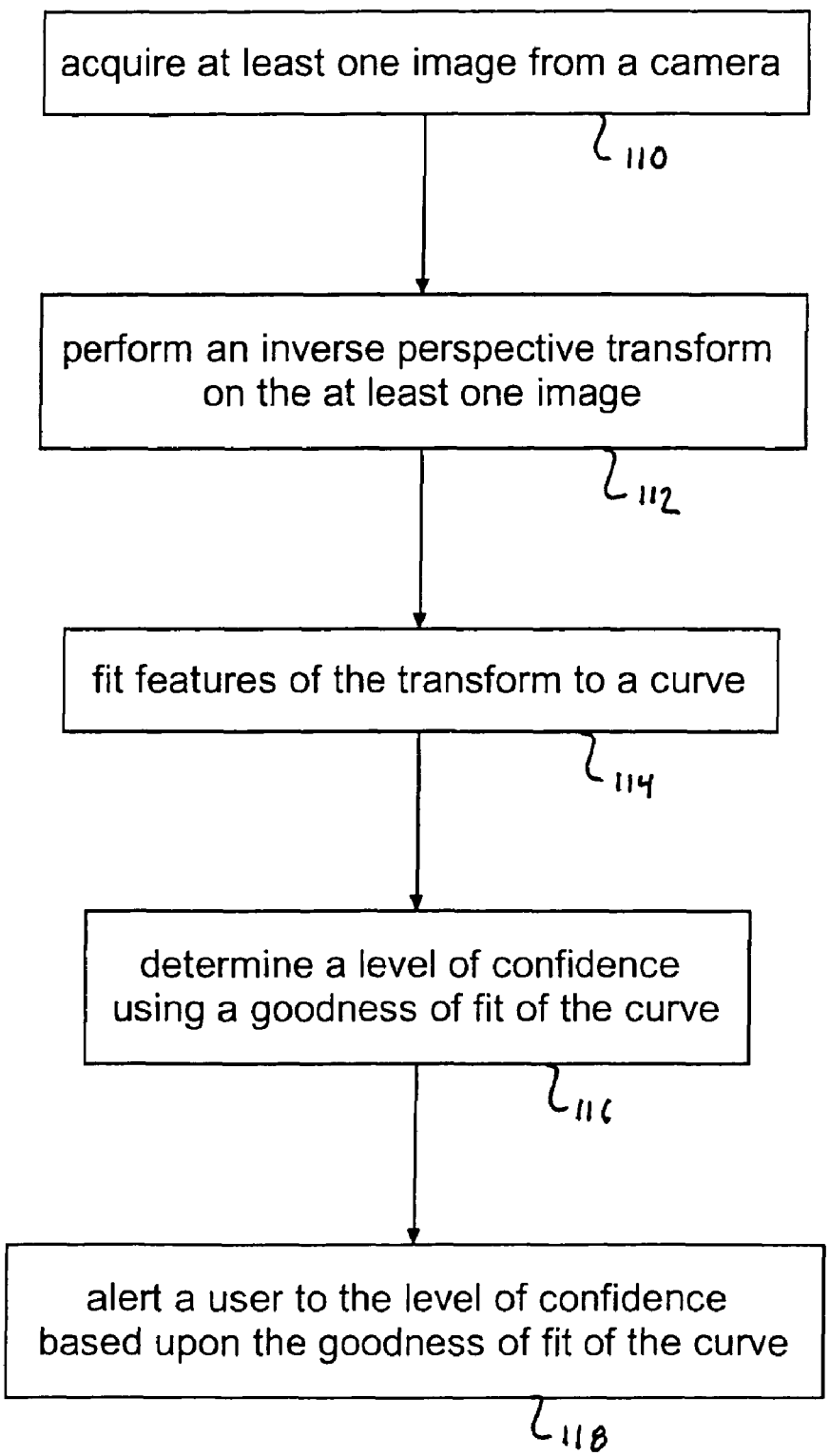

CAMERAS TO DETERMINE VEHICLE HEADING

CROSS REFERENCE TO RELATED APPLICATIONS

This application is a continuation of International Application No. PCT/GB03/01519 filed Apr. 7, 2003, the disclosures of which are incorporated herein by reference, and which claimed priority to Great Britain Patent Application No. 0208217.0 filed Apr. 10, 2002, the disclosures of which are incorporated herein by reference.

BACKGROUND OF THE INVENTION

This invention relates to improvements relating to cameras. In particular, it relates to methods of estimating the heading angle of a camera system associated with a vehicle, a method of improving the accuracy of such a camera system and apparatus for performing the methods. As used in the following description the term "heading angle" is to mean "angle of the direction of movement vector with respect to a vehicle longitudinal axis".

It is known to provide camera systems for vehicles, which capture images of objects and features on the road. A processor may then determine the position of the objects in the image relative to the vehicle. Typically, vehicle-based camera systems are used for lane or vehicle detection. It is known that, to function correctly, the alignment of the camera relative to the vehicle must be known. For an example, for a forward facing camera, an error of 0.6° in the camera yaw will lead to an error of 1 meter in the calculation of the lateral position of an object visible in the image at 100 meters distance from the vehicle. Even with careful aliment and positioning of the camera, it is still possible for a small error to exist. The camera may also become misaligned over time during use of the vehicle.

SUMMARY OF THE INVENTION

According to a first aspect of the invention, there is provided a method of calculating the heading angle of a vehicle using a camera associated with the vehicle, the method comprising capturing at least two images with the camera, calculating the lateral speed of the vehicle from the images, calculating the ground speed of the vehicle and calculating, from the ground speed and the lateral speed, a first heading angle of the vehicle.

By lateral speed, we mean the component of the velocity with which the vehicle is moving in a direction perpendicular to that in which the camera is pointing, and by ground speed, we mean the speed at which the vehicle is moving along its direction of travel.

Using the ground speed of the vehicle introduces a measurement independent of the positioning of the camera.

The method may further comprise the step of calculating a second heading angle from the images. This may then be compared to the first heading angle. In a preferred embodiment, the comparison may produce a misalignment value indicative of the angular offset of the camera from some datum. The datum may be indicative of some "ideal" alignment. The comparison may involve taking the difference between the first and second heading angles. The datum may be the forwards-backwards centre-line of the vehicle.

This, advantageously, provides a method for improving the accuracy of the measurement of the heading angle, whilst also providing a measurement of the possible misalignment of the camera.

The method may include the step of analysing the images in order to calculate heading angles by finding features that follow the direction of travel of the vehicle. Such features could include the edges of a road or lane markings on the road. The features may then be fitted to a curve. The curve may be a quadratic equation. The quadratic equation may have the form:

$$x = c_1 + c_2 z + c_3 z^2$$

where z is the distance from the camera in the direction in which the camera is pointing and x the distance from the camera in the perpendicular direction to the direction in which the camera is pointing. $c_1$ may give the offset of the feature from the position of the camera; $c_2$ may give the angle (in radians) between the direction in which the feature heads and the line of view of the camera; and $c_3$ may give the reciprocal of twice the radius of curvature of the feature. It should be noted that one transform used in one embodiment of the present invention is a transform to a plane in which "x" is the direction perpendicular to "z" in that plane.

The first calculated heading angle may be calculated by calculating the angle between the direction of the lateral velocity and that in which the vehicle is moving. As the lateral velocity is a component of the ground velocity, it is possible to construct a right-angled triangle with the ground velocity as the hypotenuse; the heading angle may be calculated as the angle opposite the side corresponding to the lateral velocity.

The lateral velocity may be calculated by measuring the rate at which the features move perpendicular to the direction of view of the camera. This may be calculated as the rate of change of $c_1$. This calculation may be averaged over more than one feature. The ground velocity may be obtained from a speedometer associated with the vehicle.

The first heading angle may be calculated by taking the inverse cosine of the ratio of the lateral velocity to the speed of the vehicle, then taking the resultant angle away from 90°. Equivalently, the first heading angle may be calculated by taking the inverse sine of the ratio of the lateral velocity to the speed of the vehicle.

The second caculated heading angle may be calculated from analysing features of the images. It may be calculated as $c_2$ in the equation. This may be performed as an average over more than one feature.

The second heading angle may be calculated without reference to the round speed. Indeed, the second heading angle may be calculated from features of the image only.

An inverse perspective transform from the image plane to the road plane may be performed on the image viewed by the camera before the features are fitted to curves. This may be given as $$x = hX/H - Y \text{ and } z = fh/H - Y$$

$$x = \frac{hX}{H-Y} \text{ and } z = \frac{fh}{H-Y}$$

where X and Y are the image co-ordinates referenced from the centre of the line of the captured image, H is indicative of the position of the horizon, f is the focal length of the camera, h is the height of the camera above the ground, z is the distance from the camera in the direction in which the camera is pointing and x the distance from the camera in the perpendicular direction to the direction in which the camera is pointing in the z direction.

This has the advantage that this uses a value already calculated in the fitting of the features to the curve. Furthermore, as the rate of change of $c_1$ will be less affected by misalignment in the camera than the heading angle calculated as $c_2$, a more accurate measurement of the heading angle is possible.

Images may be captured continually, or periodically. Images may be captured at a rate of 50, 25, 10, 5 or 1 per second, or every second or 2, 5 or 10 seconds. Correspondingly, heading angles may recalculated with every image captured, or only once for a certain number of captured images. Heading angles may be recalculated every image, or every 2, 3, 4, 5, 10, 20, 50 or 100 images.

According to a second aspect of the invention, there is provided a method of improving the accuracy of a camera system associated with a vehicle, the method comprising calculating the misalignment value according to the method of the first aspect of the invention and using this value to correct the system.

The method may further comprise repeating the method of the first aspect, with the heading angle value being first corrected by the amount indicated by the misalignment value. This can then be iteratively repeated. The method may be repeated periodically or until a desired level of accuracy is reached.

The misalignment value calculated by successive operations of this method may be filtered by a filter such that the rate of change of the misalignment is constrained to be below a maximum value. The filter may be a low pass filter and may have a time constant of substantially 3.5 seconds. This prevents noise from unduly affecting operation of a camera system, as it is unlikely that the misalignment of a camera will change at a high frequency.

The method way further comprise the step of alerting a user should the misalignment value exceed certain bounds. It may also include the step of alerting a user should the misalignment value change at a rate greater than a predefined limit. This will give the user an indication should there be a fault in the camera system.

According to a third aspect of the invention, there is provided a method of estimating the error in a measured heading angle of a vehicle travelling along a road, the road having features aligned along the length of the road, comprising the steps of:

a) Periodically capturing images of the road;
b) Analysing the or each image to determine the position of the features;
c) Fitting the features to a curve;
d) Calculating a lateral velocity of the curve relative to the vehicle;
e) Dividing the lateral velocity by the ground speed of the vehicle;
f) Taking the inverse cosine of this ratio; and
g) Taking this angle away from 90° to give a fist heading angle.

These steps advantageously give a more accurate measurement of heading angle than is possible from measuring the heading angle from images alone.

The step of analysing the features may include performing an inverse perspective transform from the image plane to the road plane. The transform may be of the form $x=hX/H-Y$ and $z=fh/H-Y$ $$x = \frac{hX}{H-Y} \text{ and } z = \frac{fh}{H-Y}$$

where X and Y are the image co-ordinates referenced from the centre of the line of the captured image, H is indicative of the position of the horizon, f is the focal length of the camera, h is the height of the camera above the ground, z is the distance from the camera in the direction in which the camera is pointing and x the distance from the camera in the perpendicular direction to the direction in which the camera is pointing in the z direction.

The curve to which the features are fitted in step (c) may be a quadratic equation. It may be of the form $x=c_1+c_2z+c_3z^2$ where x and z are as described above. The goodness of fit to this curve may be used to give a level of confidence of the fit. The lateral velocity may then be calculated as the rate of change of $c_1$. This may be averaged over more than one feature. The second heading angle may be calculated (in radians) as $c_2$. Again, this may be averaged over more than one feature. Either of the averages may be over the curves corresponding to the lane markings to either side of the vehicle.

Preferably, the method also includes the steps of:
h) Calculating a second heading angle from the curve to which the features have been fitted; and
i) Calculating the difference between the first and second heading angles to give a misalignment value indicative of the misalignment between the camera and some datum.

This provides a value that can then be used to correct other measurements using the camera. Indeed, the method may also include the step of:
j) Repeating the method, correcting the image viewed by the camera by an amount indicated by the misalignment value.

This may be repeated iteratively to improve the accuracy of measurements using the camera. The process may be repeated until the measurement of heading angle meets a desired accuracy.

The misalignment value from successive iterations of the method may be filtered such that it may only change at less than a certain rate. The filter may be a low pass filter, and it may have a time constant of substantially 3.5 seconds.

The method may only be carried out when the ground speed of the vehicle is above a certain limit. It may only be carried out when the level of confidence of the fit of the features to the curve is above a certain level.

Alternatively, the misalignment value might only be updated when the system is first associated with the vehicle, or when the vehicle is at a service station.

In a further alternative, the misalignment value may be used as an angle through which the camera should be physically moved in order to improve its alignment.

According to a fourth aspect of the invention, there is provided a camera system adapted to be fitted to a vehicle, the camera system comprising at least one camera and being adapted to correct for errors in alignment when fitted to a vehicle using the method of the first, second or third aspects. The system may include a fault indicating means, which is adapted to alert a user should the misalignment value exceed certain bounds or change at a rate that exceeds certain bounds.

The camera system may include a control means adapted to capture multiple images from the or each camera, calculate from the images the position of features on the road, and calculate heading angles from the positions of the features and the speed at which the vehicle is travelling. The speed of the vehicle may be sensed by means of a speed sensing means associated with the control means.

The control means may also be provided with a memory adapted to store the misalignment values. The memory may be of the form of flash RAM. The memory may also be adapted to store a program used to perform the method. The control means may also comprise a processor adapted to perform the calculations involved with the method. The processor may do this by running a program stored in the memory.

According to a fifth aspect of the invention, there is provided a data carrier carrying software which, when running on a processor, causes the processor to perform the method of the first, second or third aspects.

Other advantages of this invention will become apparent to those skilled in the art from the following detailed description of the preferred embodiment, when read in light of the accompanying drawings.

BRIEF DESCRIPTION OF THE DRAWINGS

FIG. 4 is a flow chart showing the steps involved in the method of this invention according to a second embodiment.

DETAILED DESCRIPTION OF THE INVENTION

Figure 1:
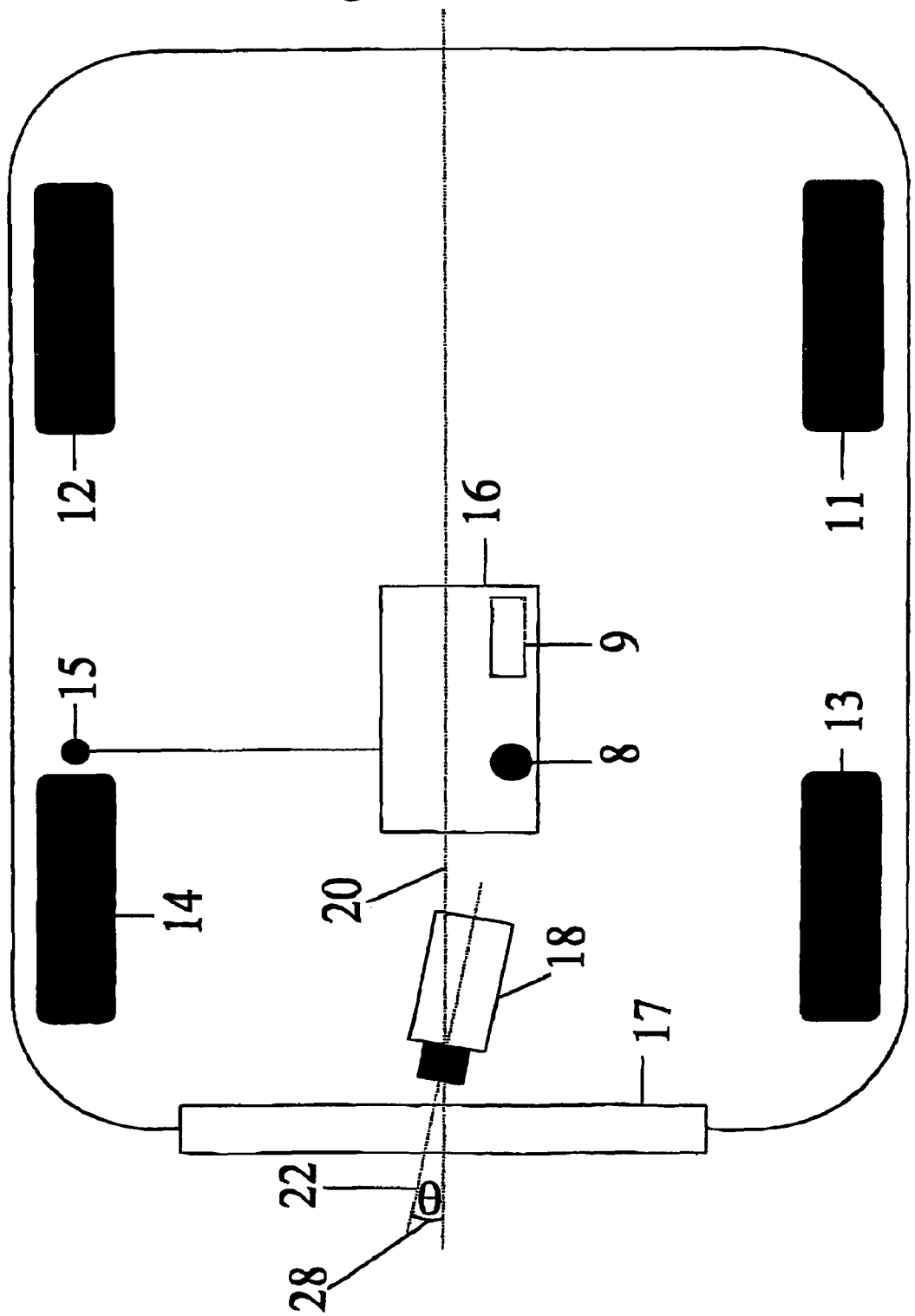
FIG. 1 is a schematic depiction of a car fitted with a camera system according to this invention.

A car 10 fitted with the camera system of the present invention is shown in FIG. 1. The car 10 could equally well be a van, lorry, motorcycle or any other vehicle adapted to travel along a road. A video camera 18 is mounted towards the front of the interior of the vehicle and views the scene visible through a windscreen 17. Ideally, the camera 18 would be mounted such that it captures images of the scene in front of the car 10 which are centered on and aligned with the centre line 20 of the car 10. However, this is difficult to achieve precisely and so in a practical system, as shown in FIG. 1 of the accompanying drawings, the view from the camera is more likely to be centred along camera view line 22, which is at an angle θ 28 to the car centre line 20. Also provided is a road wheel speed sensing means 15 that measures the speed at which the road wheels 11, 12, 13, 14 are moving. This could be of the type commonly used in vehicle speedometers. Control means 16, for example a processor such as an ECU, is associated with the camera 18 and the road wheel speed sensing means 15. The control means 16 is supplied with memory means 9 in which the algorithm for calculating the vehicle's lane position is stored together with any variables necessary for calculating such. The control means 16 is also supplied with alert means 8, in this case a light on the car's 10 dashboards for alerting a user to a fault in the system.

Figure 2:
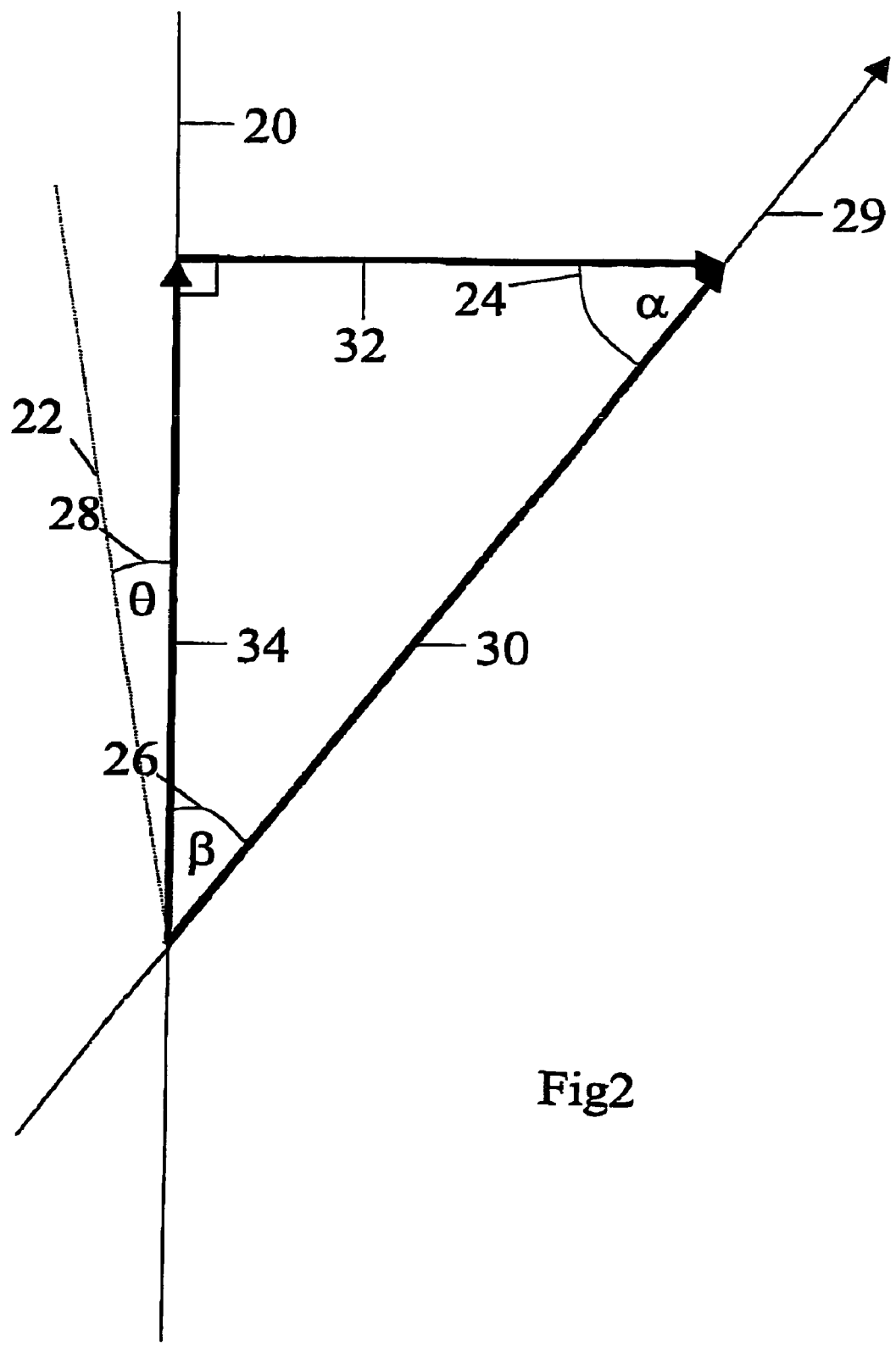
FIG. 2 is a diagram showing the geometry of the system.

FIG. 2 shows the angles and directions referred to in this description. The direction of travel 29 of the car 10 is at a heading angle β 26 from the centre line of the car 10. The speed measured by the road wheel speed sensing means 15 is depicted as a velocity $v_{wheels}$ 30. This is shown decomposed into two components; a longitudinal component $v_{long}$ 34 along the centre line 20 and a lateral component $v_{lat}$ 32 perpendicular to the centre line 20. These three velocities form a right-angled triangle with interior angles α 24 and β 26, with α=90−β.

The control means 16 periodically captures images from the video camera 18. It then applies an edge detection algorithm to the captured images in order to calculate the location of the edges of the road, lane markings and other features that follow the direction of travel of the road (hereinafter "edges"). It then applies an inverse perspective transform to translate the points relating to the respective edges from the image plane into the real world plane. The transform is given by:

$$x = \frac{hX}{H-Y} \text{ and } z = \frac{fh}{H-Y} \quad (1)$$

where X and Y are the image co-ordinates referenced from the centre of the line of the captured image, H is the horizon, f is the focal length of the camera 18, h is the height of the camera above the ground. The x co-ordinate gives the lateral distance perpendicular to the view line 28 of the camera 18, whilst the z co-ordinate gives the distance in the real world in the direction away from the car 10 perpendicular to the view line 28.

A tracking algorithm, which uses an adapted recursive least-squares technique in the estimation of the lane model parameters, fits the transformed edges to a quadratic equation in real space:

$$x = c_1 + c_2 z + c_3 z^2 \quad (2)$$

where x and z are as previously described: $c_1$ is the edge offset, which gives a lateral distance $d_{lat}$ from the relevant edge to the view line 22; $c_2$ is the first, measured, heading angle β 26 (in radians): and $c_3$ is the reciprocal of twice the radius of curvature of the lane. The goodness of fit of the transformed edge points to equation (2) can be used to give a level of confidence in the fit.

The lateral velocity of the vehicle can then be calculated by calculating the rate of change of lane offsets with respect to time, taking an average position of, say, the two lane markings on either side of the car 10. This could be expressed as:

$$v_{lat} = \frac{c_1' - c_1}{\Delta t} \quad (3)$$

with $c_1'$ and $c_1$ being the average lane offset at two different times and Δt being the time interval between those times.

However, there are likely to be errors in these coefficients due to misalignment of the camera 18. If the camera is mispositioned by an angle θ 28 in a direction opposite to that in which the heading angle β 26 is measured (as shown in FIG. 2) then the lane detection algorithm will overestimate the heading angle by θ (that is the measured heading angle will be θ+β). The lane offsets, and hence lateral velocity $v_{lat}$ will, on the other hand, be overestimated by a smaller amount. Accordingly, the lateral velocity $v_{lat}$ is more accurately measurable than the heading angle.

Figure 3:
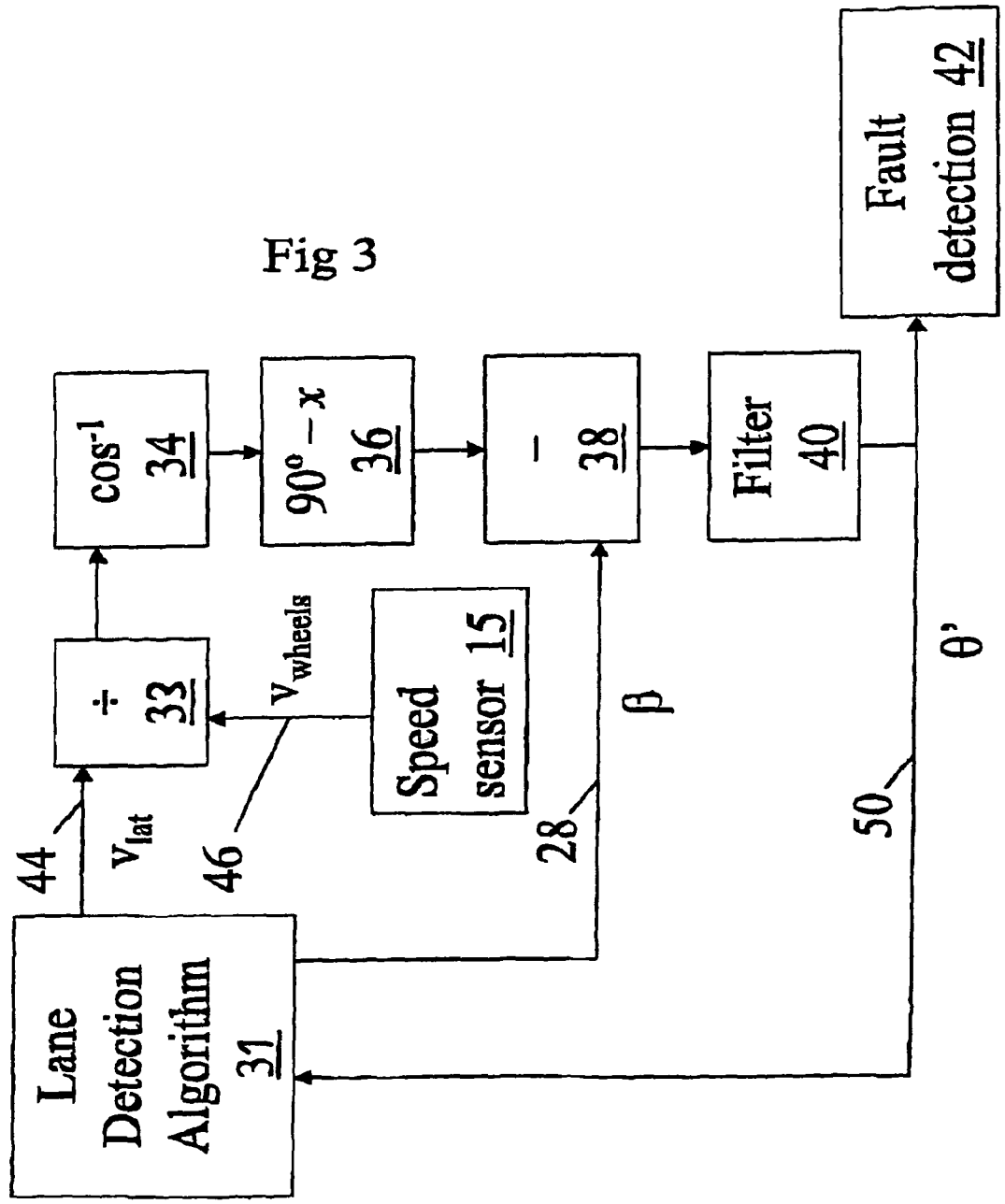
FIG. 3 is a flow hart showing the steps involved in the method of this invention.

Accordingly, $v_{lat}$ can be used to estimate the error in the offsets. FIG. 3 shows the method for carried out by the control means 16 in order to do this. Initially, the algorithm 30 described above calculates values for lateral velocity $v_{lat}$ 44 and heading angle β 28. The lateral velocity $v_{lat}$ is divided 33 by the wheel speed $v_{wheels}$ measured by the road wheel speed sensor 15. The inverse cosine 34 is taken of this ratio and the resultant angle taken away from 90° 36. This gives a second heading angle that is a more accurate indication of the actual heading angle than is obtainable from the algorithm described above. The measured heading angle 28 is then taken away from the more accurate value to give an estimate of the misalignment angle. This value is then filtered through a very low pass filter with a time constant in the region of 3.5 seconds (tuneable to compensate for the level of noise in the circuit) to remove any spurious vibrations, as it is not envisaged that the misalignment angle will vary quickly. The filtered misalignment angle 50 can then be used as an estimate .theta.' of the actual misalignment angle θ 28. This filtered value 50 can then be fed back into the lane detection algorithm as a decrement to be taken away from the measured heading angle.

The process can be repeated with the next set of measurements in an iterative manner in order to gradually decrease the errors introduced by the misalignment. The error correction algorithm is only updated when: the measured road wheel 11, 12, 13, 14 speed is above a certain limit; the lane detection algorithm indicates that the confidence with which it has measured the position of the lanes is above a certain limit; and that the measured heading angle and filtered misalignment error are within certain tolerances.

In one embodiment, it is envisaged that the process could be performed periodically with every image captured by the camera 18 or less frequently, say once every few minutes. Alternatively, the misalignment angle might only be updated when the system is first fitted to the car 10 and then when the car 10 is returned to a service station, when the memory 9 holding the filtered misalignment angle 50 can be updated. In a further alternative, the misalignment value could be used as an angle by which the positioning of the camera should be adjusted in order for it to be properly aligned.

The error correction algorithm is also provided with a fault detection subroutine 42 that signals the user of the car 10 should a fault occur with the system using the alert means 8. Examples of the criteria that this subroutine could use include the speed at which the misalignment angle changes, or the magnitude of the misalignment. If any of these depart from predetermined ranges then an alert is signalled. The fault detection subroutine 42 may also be used to calculate, at the point of manufacture, whether the system has been assembled within tolerances.

There is shown in FIG. 4 a method 100 for analyzing at least one images to calculate a heading angle by finding features that follow a direction of travel, according to the present invention. The method 100 begins with step 110 where at least one image from a camera is acquired, such as an image from the video camera 18 of the car 10. Next, in step 112, an inverse perspective transform is performed on the at least one image. Then, in step 114 features of the transform are fit to a curve. In step 116, a level of confidence is determined using a goodness of fit of the curve. Finally, in step 118 a user is alerted to the level of confidence of the analysis based upon the goodness of fit of the curve.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of calculating a heading angle of a vehicle using a camera associated with said vehicle, said method comprising capturing at least two images with said camera, calculating a lateral speed of said vehicle from said two images, calculating a ground speed of said vehicle independently of said two images and calculating, from said ground speed and said lateral speed, a first heading angle of said vehicle and, further comprising a step of calculating a second heading angle from said images.

2. The method of claim 1 wherein said second heading angle is compared to said first heading angle to produce a misalignment value indicative of an angular offset of said camera from a datum.

3. The method of claim 1 wherein said second heading angle is calculated without reference to said ground speed.

4. The method of claim 3 wherein said second heading angle is calculated from features of said two images only.

5. The method of claim 1 wherein said first heading angle is calculated by calculating an angle between a direction of said lateral velocity and a direction in which said vehicle is moving, and taking the angle calculated between the direction of said lateral velocity and the direction in which said vehicle is moving away from 90° to produce said first heading angle.

6. The method of claim 5 wherein said first heading angle is calculated by decomposing said ground velocity into two perpendicular components to form a right-angled triangle, one of said components being a lateral velocity, said first heading angle being the angle in said triangle opposite said lateral velocity.

7. A camera system adapted to correct for errors in alignment based upon a calculated heading, said camera system being adapted to be fitted to a vehicle, said camera system comprising at least one camera fitted to the vehicle, said camera system using the method of claim 1 to calculate the heading.

8. A camera system according to claim 7 wherein said system is configured to calculate a misalignment value, wherein said system includes a fault indicator, which is adapted to alert a user should said misalignment value of said camera exceed certain bounds or change at a rate that exceeds certain bounds.

9. A camera system according to claim 7, further including a controller means adapted to capture multiple images from the camera, calculate from said images a position of features on a road, and calculate heading angles from positions of said features and the speed at which said vehicle is travelling 10. A camera system according to claim 7 wherein a speed of said vehicle is sensed by means of a speed sensor associated with a controller.

11. A camera system according to claim 7 wherein said system is configured to calculate misalignment values, wherein said control means is also provided with a memory adapted to store said misalignment values.

12. The method of claim 3 further comprising a step of performing an inverse perspective transform on said image viewed by said camera before features are fitted to curves, said transform being given by:

$$x = \frac{hX}{H-Y} \text{ and } z = \frac{fh}{H-Y}$$

where X and Y are image co-ordinates referenced from a centre of a line of said captured image, H is indicative of a position of a horizon, f is a focal length of said camera, h is a height of said camera above ground, z is a distance from said camera in a direction in which said camera is pointing and x is a distance from said camera in a perpendicular direction to the direction in which said camera is pointing.

13. A method of calculating a heading angle of a vehicle using a camera associated with said vehicle, said method comprising capturing at least two images with said camera, calculating a lateral speed of said vehicle from said two images, calculating a ground speed of said vehicle independently of said two images and calculating, from said ground speed and said lateral speed, a first heading angle of said vehicle and, further including the step of analyzing said two images in order to calculate heading angles by finding features that follow a direction of travel of said vehicle.

14. The method of claim 13 wherein said lateral velocity is calculated by measuring a rate at which said features move perpendicular to a direction of view of said camera.

15. The method of claim 13 wherein said features are fitted to a curve having a form:

$$x = c_1 + c_2 z + c_3 z^2$$

where z is the distance from said camera in a plane substantially parallel to a road in a direction in which said camera is pointing, x is the distance from said camera in the plane substantially parallel to a road in a perpendicular direction to the direction in which said camera is pointing, and $c_1$, $c_2$ and $c_3$ are coefficients to be determined.

16. The method of claim 15 wherein said lateral velocity is calculated as a rate of change of $c_1$.

17. The method of claim 15 wherein said second heading angle is calculated as $c_2$.

18. A method of improving an accuracy of a camera system associated with a vehicle, said method comprising calculating a misalignment value according to claim 2 and using this value to correct said accuracy of said system.

19. The method of claim 18 further comprising repeatedly recalculating said misalignment value, with said first heading angle being first corrected by the amount indicated by said misalignment value with each successive recalculation.

20. The method of claim 19 wherein said misalignment value calculated by each successive iteration is filtered by a filter such that a rate of change of said misalignment value is constrained to be below a maximum value.

21. The method of claim 18 further comprising a step of alerting a user should said misalignment value exceed certain bounds.

22. The method of claim 18 further comprising a step of alerting a user should said misalignment value change at a rate greater than a predefined limit.

23. A method of estimating an error in a measured heading angle of a vehicle travelling along a road, said road having features aligned along a length of said road, comprising the steps of:
a) Periodically capturing images of said road with a camera;
b) Analysing each image to determine a position of said features;
c) Fitting said features to a curve;
d) Calculating a lateral velocity of said curve relative to said vehicle;
e) Dividing said lateral velocity by a ground speed of said vehicle to produce a ratio:

f) Taking an inverse cosine of said ratio to produce an angle;
g) Taking said angle away from 90° to give a first heading angle;
h) Calculating a second heading angle from a curve to which said features have been fitted; and
i) Calculating a difference between said first heading angle and said second heading angle to give a misalignment value indicative of a misalignment between said camera and a datum.

24. The method of claim 23 wherein said step of analysing said features includes performing an inverse perspective transform.

25. The method of claim 24 wherein said inverse perspective transform is of a form:

$$x = \frac{hX}{H-Y} \text{ and } z = \frac{fh}{H-Y}$$

where X and Y are the image co-ordinates referenced from a centre of a line of said captured image, H is indicative of a position of a horizon, f is a focal length of said camera, h is a height of said camera above ground, z is a distance from said camera in a direction in which said camera is pointing and x is a distance from said camera in a perpendicular direction to the direction in which said camera is pointing.

26. The method of claim 23 wherein said curve to which said features are fitted in step (c) is a quadratic equation of a form $x = c_1 + c_2 z + c_3 z^2$ where z is a distance from said camera in a plane substantially parallel to a road in a direction in which said camera is pointing, x is a distance from said camera in a plane substantially parallel to a road in a perpendicular direction to the direction in which said camera is pointing, and $c_1$, $c_2$ and $c_3$ are coefficients to be determined.

27. The method of claim 26 wherein said goodness of fit to this curve is used to give a level of confidence of said fit.

28. The method of claim 26 wherein said lateral velocity is calculated as a rate of change of $c_1$.

29. The method of claim 26 wherein said second heading angle is calculated as $c_2$ in radians.

30. The method of claim 23, further comprising:
j) Repeating said method and correcting said image viewed by said camera by an amount indicated by said misalignment value.

31. The method of claim 30 wherein step (j) is repeated iteratively.

32. The method of claim 30 wherein step (j) is only carried out when a ground speed of said vehicle is above a certain limit.

33. The method of claim 30 wherein step (j) is only carried out when a level of confidence of fit of said features to said curve is above a certain level.

34. The method of claim 33 wherein said misalignment value is used as an angle through which said camera should be physically moved in order to improve its alignment.

35. A data storage device carrying software which, when running on a processor, causes the processor to perform the method of claim 1.

* * * * *